United States Patent Office 3,462,398
Patented Aug. 19, 1969

3,462,398
CONTINUOUS PROCESS POLYMERIZATION OF BETA-LACTONES
Willem M. Wagner and Arie Klootwijk, Amsterdam, Netherlands, assignors to Shell Oil Company, New York, N.Y., a corporation of Delaware
No Drawing. Filed Aug. 22, 1966, Ser. No. 573,793
Claims priority, application Netherlands, Sept. 7, 1965, 6511629, 6511630
Int. Cl. C08g *17/017, 17/02*
U.S. Cl. 260—78.3      5 Claims

ABSTRACT OF THE DISCLOSURE

Beta-lactones are polymerized in the presence of a catalyst wherein the lactone is a moving discontinuous phase in an inert aliphatic hydrocarbon diluent in which the monomer and polymer thereof are insoluble and which has a viscosity of at least 3 centistokes at a polymerization temperature of between 10 and 150° C.

---

This invention relates to a method for polymerizing lactones.

Lactones and particularly the beta-lactones are generally rapid polymerizing monomers, the polymers of which are useful in preparing a variety of products. These polymers are well known in the art and have been prepared heretofore by a variety of conventional methods such as solution, bulk or suspension polymerization techniques. These methods while useful have not been altogether satisfactory for a number of reasons. For example, since the lactone polymerization reaction is highly exothermic, in the bulk polymerization technique with no solvent media being present, heat removal from the polymerizing monomer mixture is difficult requiring the use of special heat exchanging reaction vessels. On a commercial scale the disadvantages are readily apparent. In solution polymerization polymer recovery often requires tedious work-up of the polymer which involves treatment of the polymerization solution with a suitable material in which the polymer is insoluble, separation of the polymer, drying, etc.

In suspension polymerization in which the polymerization reaction is carried out in the presence of diluents in which the polymer is insoluble the use of high reaction stirring speeds is generally required in an attempt to maintain a relatively homogeneous reaction mixture. However, unless the polymer suspension is sufficiently stable, the reaction rate and the polymer particle formation will occur unevenly throughout the reaction mixture resulting in agglomeration of polymer particles and clotted products rather than the desired well-shaped separate polymer granules of uniform size. Not only is particle size and agglomeration prevention a problem but fouling of the reactor equipment with polymer takes place necessitating special recovery and cleaning measures. Often suspension stabilizers and close regulation of monomer:diluent ratios as well as careful stirring control are necessary in order to insure the desired polymer size and to simplify polymer recovery.

According to the present invention there is provided an improved method for preparing polymers of beta-lactones. The invention comprises polymerization of the lactones in the presence of an inert diluent in which both monomer and polymer are insoluble in such a manner that the polymerizing monomer is present in the diluent phase as a mobile discontinuous phase.

The polymers with which the invention is concerned are the beta-lactones and preferably beta-propiolactones wherein the hydrogens of the beta carbon atom are not replaced by other atoms or groups. Those beta-propiolactones having a tertiary or quaternary alpha-carbon atom are especially preferred. Excellent polymers are those prepared from alpha,alpha-dialkyl-beta-propiolactone wherein the alkyl groups are those having from 1 to 4 carbon atoms. Suitable examples include alpha,alpha-dimethyl-beta-propiolactone, alpha-methyl-alpha-ethyl-beta-propiolactone, alpha-methyl-alpha-isosopropyl-beta - propiolactone, alpha-ethyl-alpha-tert - butyl-propiolactone, alpha, alpha-diisopropyl-propiolactone, etc.

Other monomers may be used in order to prepare copolymers with the above-mentioned beta-lactones. Examples of comonomers which are suitable in preparing such copolymers include, for example, epoxy compounds such as ethylene oxide, epichlorohydrin, glycidyl ethers and esters and the like.

Suitable catalysts which may be used in the polymerization reaction include primary, secondary or tertiary amines such as trimethylamine, triethylamine, tri(beta-hydroxyethyl)amine, tripropylamine, triisopropylamine, methyldiethylamine, tri-n-butylamine, diethyl-n-butylamine, dimethylhexylamine, triphenylamine, diethylamine, di-n-propylamine, diisopropylamine, dibutylamine, monobutylamine, monophenylamine, triethylenediamine, hexamethylenetetraamine, and the like. Other catalysts include quaternary ammonium compounds and especially the tetraalkylammonium halides or hydroxides where the alkyl groups have from 1 to about 4 carbon atoms such as tetraethylammonium bromide, tetrapropylammonium bromide, ethyltriisopropylammonium chloride, tetraethylammonium hydroxide, etc. These catalysts are disclosed in copending U.S. application Ser. No. 388,662, filed Aug. 10, 1964, now U.S. 3,268,487, issued Aug. 23, 1966.

Another group of very suitable polymerization catalysts are the arsines, stibines and phosphines as well as the addition products thereof. Suitable catalysts of this type are those disclosed in copending U.S. application Ser. No. 363,992, filed Apr. 30, 1964 now U.S. 3,268,487, issued Aug. 23, 1966, the description thereof which is incorporated herein by reference. Especially preferred catalysts of this type are the tertiary phosphines and the quaternary phosphonium compounds such as trimethylphosphine, triethylphosphine, tri(beta-chloroethyl)phosphine, tripropylphosphine, triisopropylphosphine, tri-n-butylphosphine, triisobutylphosphine, dimethylhexylphosphine, diethyl-n-pentylphosphine, and diisopropyl-n-butylphosphine, triphenylphosphine, tribenzylphosphine and tritolylphosphine tetrabutylphosphonium bromide, triphenylbutylphosphonium bromide, tetraethylphosphonium hydroxide and ethyltriisopropylphosphonium bromide.

Catalysts concentrations may be between about 0.0001 to about 10% by weight based on the monomer present. However, preferred are catalyst concentrations between about 0.001 and 1%. The catalyst may be mixed with the monomer at temperatures below about 0° C. prior to polymerization.

The invention comprises polymerizing the monomer which is present as a moving discontinuous phase within the diluent phase. The movement of the two phases relative to one another may be accomplished by agitation of the diluent phase such as by setting it in motion by stirring etc. However, it is preferable that the movement of the two phases relative to each other is due in chief to the difference in specific gravity of the two phases. Thus, in the preferred embodiment, agitation is omitted altogether.

The discontinuous monomer phase conveniently comprises droplets of monomer moving within the diluent phase under polymerizing conditions. Thus, the droplets of the beta-lactones which are easily polymerizable in the presence of suitable catalysts as set forth above and under conditions disclosed herein polymerize during the passage through the diluent and are converted to polymer particles. Initially a thin polymer film on the droplet is formed fairly soon after having been brought in contact with the diluent phase. The film maintains the droplet in a reasonably spherical shape throughout the remainder of the polymerization depending, of course, on the relative rate of movement of the monomer phase and diluent phase with respect to each other. Thus, further deformation during the passing of the polymerizing monomer through the reaction medium is avoided. In this manner, the polymer is recovered as spheres or droplets of solid polymer.

A very convenient embodiment of this process is carried out by passing a stream of monomer drops into the diluent, whereby the polymerizing drops move through the diluent due to the difference in their specific gravities. The movement of the polymerizing monomer drops in this manner may be upwardly or downwardly relative to the diluent depending on whether the monomer is lighter or heavier than the diluent phase. Naturally, diluent movement or flow within the reaction vessel will also influence the flow of the polymerizing monomer particles relative to the reaction zone.

The inert diluents used in the polymerization process of this invention are saturated aliphatic hydrocarbons in which the beta-lactone monomers and polymers thereof are insoluble. By insoluble is meant those diluents in which the monomer or polymer are soluble no more than 10% by weight at the polymerization temperature. These hydrocarbons preferably have specific gravities different than that of the polymerizing monomer drop in order to provide for movement of the discontinuous monomer phase without agitation of the diluent. Thus, recovery of the polymer drops is quite convenient since they will have collected at one end of the reaction vessel without centrifugation.

The aliphatic hydrocarbon diluents used in the invention are those having a viscosity of at least 3 centistokes at the polymerization temperature and preferably at least 7.5 centistokes and more preferably at least 10 centistokes at the reaction temperature. The viscosity of the diluent greatly influences the mobility of the polymerizing monomer drops within the reaction medium. Thus, it has been found according to the invention, unless the diluents used are of the viscosities as set forth herein, the polymerization products obtained are unsuitable.

A class of viscous aliphatic hydrocarbon diluents which are especially useful in the process as defined herein are the paraffinic oils such as the medicinal oils or white oils. These oils are highly refined lubricating oils which have been solvent extracted and treated with fuming sulfuric acid to remove aromatic and unsaturated constituents. Suitable examples of such diluents are the Ondina and Risella oils marketed by Shell Oil Company. Such oils have viscosities, for example, between about 30 and 230 centistokes at 20° C. and between about 10 and 50 centistokes at 50° C.

It is also possible to use an aliphatic hydrocarbon diluent which itself has a viscosity of less than the limits set forth above at the desired reaction temperature provided that the viscosity of the reaction medium is raised to the necessary range by the addition of viscosity increasing compositons such as silicones, polyisobutylene, polyethylene and the like. However, the use of the hydrocarbons which themselves have the necessary viscosity is preferred.

Polymerization temperatures between about 10 and 150° C. are suitable and preferably between about 20 and 120° C. However, care must be taken to avoid temperatures at which monomer or polymer are soluble in the diluent in excess of 10% as indicated above. Since the polymerization reaction is exothermic the use of a flowing diluent is recommended. In such a manner the diluent is removed continuously from the reactor where it is cooled and recycled to the reactor.

The ratio of hydrocarbon diluent:monomer in the reaction mixture may be between about 20:1 and about 2:1 respectively with between about 5:1 and about 2.5:1 being preferred.

The process of the invention has an important advantage in being able to easily produce polymer products having desired granule size which size can be easily regulated. This is accomplished by passing the monomer drops into the diluent with the aid of a suitable dispensing means. As set forth above, a thin polymer film is formed around the easily polymerizable monomer drop. During the polymerization the volume of the drop will decrease slightly. However, the choice of drop size governs the resulting polymer granule size. Thus, for example, a product of uniform grain size of 2.5 mm. diameter is obtained by adding monomer drops having a diameter of slightly over 2.5 mm. to the diluent phase. The drop size may be conveniently varied between about 0.5 and 6.0 mm. diameter with resulting product granules of uniform size. Such a process offers significant advantages over the processes of the prior art utilizing other methods wherein polymer recovery and work-up is difficult or tedious and especially the efforts necessary to obtain products granules of somewhat uniform size.

Other additives may be incorporated into the polymerization reaction mixture. Fillers, pigments, dyes, heat stabilizers, antioxidants and the like may be added as desired. The following examples are given in order to illustrate the process of the invention. Unless otherwise specified, parts are given by weight.

EXAMPLE I

Purified alpha,alpha-dimethyl-beta-propiolactone was mixed with 0.5% butyltriphenylphosphonium bromide at −10° C. The cooled monomer was added dropwise from a funnel into a vertical tube 60 cm. long which was filled with a highly refined paraffinic oil having a temperature of 60° C. and a viscosity of about 33 centistokes at that temperature and a specific gravity of 0.869 at 25° C.

The monomer drops sank through the oil at a rate of about 4 cm. per second. Round polymer granules having a diameter of about 3–5 mm. collected at the bottom of the reactor tube. The polymer conversion was 100% with the polymer having an intrinsic viscosity of 5.5 dl./g. as determined in trifluoroacetic acid at 25° C.

EXAMPLE II

A tubular reactor having a length of 180 cm. and a diameter of 20 cm. was filled with a highly refined paraffinic oil having a specific gravity of 0.866 at 25° C. and a viscosity of 10 centistokes at 50° C. The reactor was equipped so that the oil could be continuously drawn off, cooled and recycled to the reaction zone. Drops of purified alpha-methyl-alpha-ethyl-beta-propiolactone containing 0.1% triethylenediamine and having a diameter of about 2 mm. were dispensed into the oil at the top of the reactor at the rate of 100 moles/hour. The drops flowed downwardly at 4 cm./second in relation to the oil which was being withdrawn from the bottom of the reactor, cooled and recycled to the top of the reactor. The temperature of the oil at the top of the reactor was 68° while at the bottom of the reactor it rose to 78° C. The viscosity of the oil at the reaction temperatures was about 6–7 centistokes. Polymer granules were continuously separated from the recycling diluent. The granules were of a uniform size of about 2 mm. diameter and had an intrinsic viscosity of 4.16 dl./g. The polymerization was 100% complete.

EXAMPLE III (A) Purified alpha,alpha - dimethyl-beta-propiolactone containing 0.001% butyltriphenylphosphonium bromide was dispersed in the paraffinic oil used in Example I. The diluent temperature was 90° C. at which the viscosity was about 12 centistokes.

Monomer drops were continuously added to and dispersed throughout the oil by vigorous stirring with the average size of the polymerizing drops being maintained below 2 mm. diameter. The total amount of monomer added to the oil was 33% based on the weight of the oil. During the reaction no agglomeration of polymer particles was observed and polymer build-up on the reaction walls was negligible. The product was recovered and consisted of separate granules having a bulk density of 0.65 kg./l. and an intrinsic viscosity of 5.5 dl./g.

(B) For the purpose of comparison the procedure set forth in (A) above was repeated with n-decane as the diluent at a reaction of 35° C. at which the viscosity was 0.5 centistoke. After only 5% of the monomer had been added to the diluent phase, agglomeration of the polymer particles was noted. The addition of monomer was continued at the same rate until 20% of the monomer had been introduced at which point over 70% of the polymer particles present had clotted together.

We claim as our invention:

1. A process for polymerizing a beta-lactone in the presence of a catalyst which comprises (1) polymerizing the lactone as a moving discontinous phase in a diluent wherein said discontinuous phase consists of polymerizing lactone monomer drops whose movement through the diluent is due to the difference in specific gravity between the polymerizing monomer and the diluent, said diluent being an inert aliphatic hydrocarbon in which the lactone monomer and polymer thereof are insoluble and which has a viscosity of at least 3 centistokes at the polymerization temperature of between 10 and 150° C., (2) withdrawing the polymer-diluent dispersion from the raction zone, (3) separating the polymer and (4) returning the diluent to the reaction zone.

2. A process as in claim 1 wherein the diluent is continuously recycled to the reaction zone.

3. A process as in claim 1 wherein the withdrawn dispersion is cooled before the diluent is recycled to the reaction zone.

4. A process as set forth in claim 1 wherein the lactone is an alpha,alpha-dialkyl-beta-propiolactone.

5. A process as set forth in claim 1 wherein the catalyst is selected from the group consisting of amines, quaternary ammonium compounds, tertiary phosphines and quaternary phosphonium compounds.

References Cited

UNITED STATES PATENTS

| | | | |
|---|---|---|---|
| 2,582,849 | 1/1952 | Ramondt | 260—72.5 |
| 2,853,474 | 9/1958 | Reynolds et al. | 260—78.3 |
| 2,951,828 | 9/1960 | Zeile et al. | 260—77.5 |
| 3,021,310 | 2/1962 | Cox et al. | 260—78.3 |
| 3,268,486 | 8/1966 | Klootwijk | 260—78.3 |

WILLIAM H. SHORT, Primary Examiner

E. NIELSEN, Assistant Examiner

U.S. Cl. X.R.

260—95